Nov. 7, 1944.  L. LENDINARA  2,362,383
FLEXIBLE JOINTS
Filed Sept. 18, 1942  2 Sheets-Sheet 2

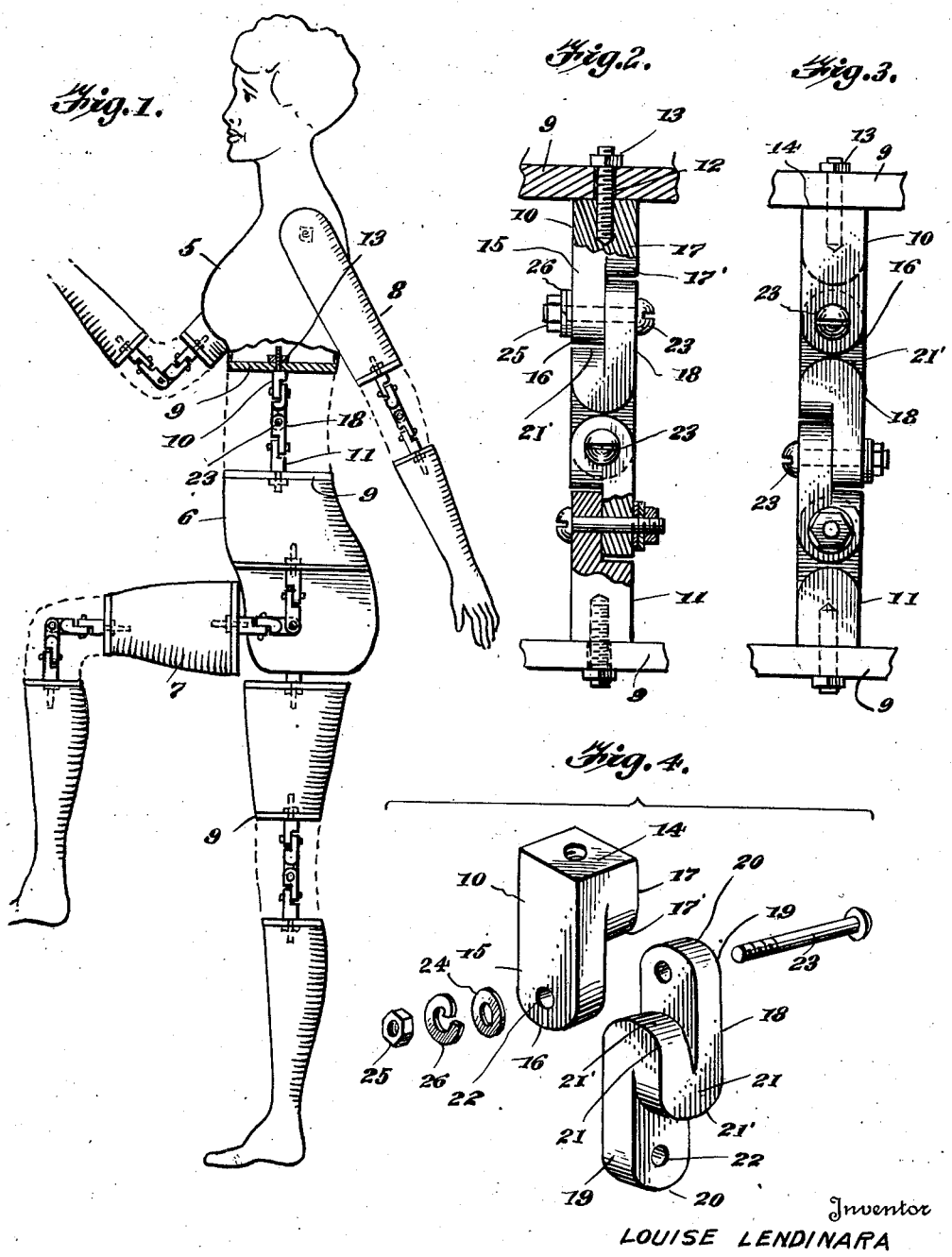

Inventor
LOUISE LENDINARA

By Lacey & Lacey
Attorneys

Patented Nov. 7, 1944

2,362,383

UNITED STATES PATENT OFFICE 2,362,383

FLEXIBLE JOINT

Louise Lendinara, New York, N. Y.

Application September 18, 1942, Serial No. 458,915

2 Claims. (Cl. 287—1)

This invention relates to flexible joints and more particularly to a joint especially designed for connecting the movable parts of lay figures such as mannequins and the like.

The object of the invention is to provide a flexible joint of simple and durable construction in which the employment of metal parts is either eliminated or reduced to a minimum, thereby effecting a material saving in the cost of production and avoiding the necessity of obtaining priorities incident to the manufacture thereof.

A further object of the invention is to provide a flexible joint, the construction of which is such that the connecting links may be swung at various angles to each other so as to allow the arms, legs, and other movable parts of a mannequin to be adjusted at any desired angle or inclination with respect to the body thereof and thus permit said mannequin to assume different postures, in displaying dresses and other garments.

A further object of the invention is to so construct the flexible joint that a plurality of bending movements, front, back, left and right, may be obtained.

A further object of the invention is generally to improve this class of devices so as to increase their utility, durability and efficiency.

In the accompanying drawings:

Figure 1 is a side elevation of a mannequin provided with the flexible joint embodying the present invention.

Figure 2 is an enlarged side view of the flexible joint.

Figure 3 is a front view.

Figure 4 is a perspective view of one of the terminal links and an intermediate link, detached, the parts being separated for the sake of clearness.

Figure 5:
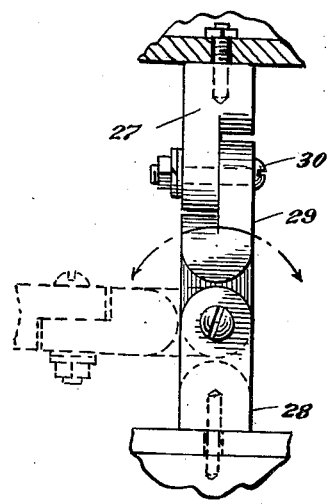
Figure 5 is a side view of a flexible joint embodying only three links and indicating, in dotted lines, how the links can be moved to a position at right angles to each other.

The improved flexible joint forming the subject matter of the present invention is particularly designed for use in connection with mannequins and other lay figures and, in Figure 1 of the drawings, is shown applied to a mannequin of conventional construction including a chest section 5, trunk section 6, leg sections 7 and arm sections 8, each section being preferably of hollow construction to reduce the weight thereof and provided with a base plate indicated at 9. The joints between the different movable parts of the mannequin are of the same construction and operation and a detailed description of one of said flexible joints will, therefore, suffice.

The joint comprises terminal relatively stationary links 10 and 11, preferably formed of wood, and these terminal links may be cemented or otherwise rigidly secured to the adjacent base plates 9, or fastened thereto by suitable threaded bolts 12, engaging nuts 13, so as to permit rotative movement of said links around their vertical axes. The terminal links 10 and 11 are provided with flat outer faces 14 which contact with the adjacent base plates 9, each terminal link being provided with a depending ear 15 having a curved terminal surface 16, and also provided with a lateral shoulder 17 having a similar curved surface 17'. The intermediate links 18 are each provided with oppositely directed angularly disposed ears 19 having terminal curved surfaces 20 of the same curvature as the surfaces 16 and 17', and are also provided with intermediate lateral shoulders 21 having similar curved surfaces 21', one of which is disposed opposite the curved surface 16 of the adjacent terminal link and the other opposite the curved surface 20 of the adjacent intermediate link, as best shown in Figs. 2 and 4 of the drawings.

The ears 15 and 19 of adjacent links are provided with transverse openings 22 adapted to receive either metal or wood screw bolts 23 which extend therethrough and form a pivotal connection between the links constituting the joint. Mounted on the outer end of each pivot bolt 23 is a flat washer 24 and a clamping nut 25, and interposed between the washer and nut is a resilient split washer indicated at 26, the purpose of which is to cause sufficient friction between adjacent links so as to hold them in adjusted position after the joint has been bent or flexed laterally to cause the movable joints of the mannequin to assume the desired position.

The curved surfaces 16 and 20 are each struck from an arc with the adjacent bolt receiving opening 22 as a center, while the curved surfaces 21' of the intermediate links are each curved in an arc struck from the transverse center thereof.

By having all of the curved surfaces of the links the same, said links may be swung at right angles to each other so as to permit four cardinal bending movements of the mannequin sections, namely, front, back, right and left, the sections being held in adjusted position by means of the tension of the resilient washers 26, as will be readily understood.

Figure 6:
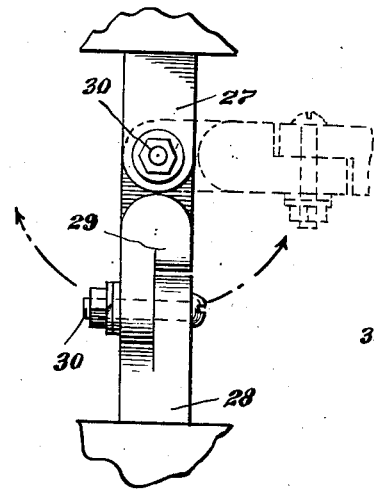
Figure 6 is a front view of Figure 5.

In Figure 1 of the drawings, the flexible joint comprises four pivotally connected links, namely, two terminal links and two intermediate links, and in Figures 5 and 6 of the drawings, there is illustrated a modified form of the invention in which the four movements above referred to can be accomplished by the use of only three links, the terminal links being indicated at 27 and 28 and the intermediate link at 29, the parts being pivotally united by pivot pins or bolts 30 in the manner previously set forth.

Figure 7:
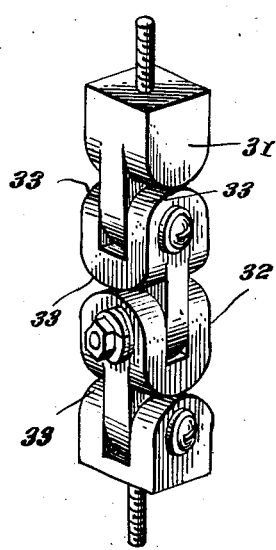
Figure 7 is a perspective view illustrating a modified form of the invention, in which the links are in the form of male and female members.
Figure 8:
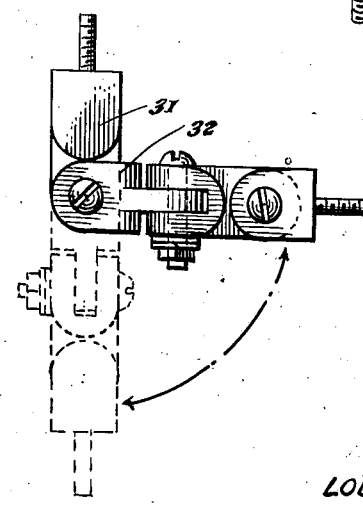
Figure 8 is a side elevation of the structure shown in Figure 7, showing how the links can be swung laterally with respect to each other.

In Figures 7 and 8 of the drawings, there is illustrated another embodiment, in which the pivoted members of the joint comprise male and female links 31 and 32 having curved confronting surfaces 33 similar to the curved surfaces shown in Figure 1 of the drawings.

Figure 9:
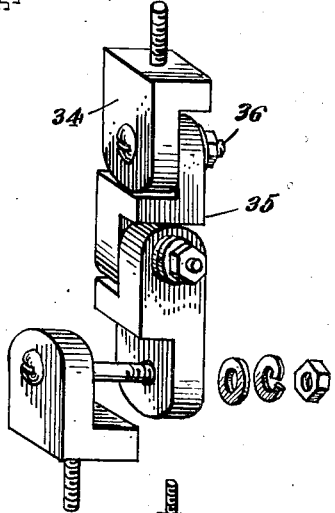
Figure 9 is a perspective view illustrating another form of the invention.

In Figure 9 of the drawings is illustrated a further modification in which the links 34 and 35 are of angular construction and pivotally connected in contacting relation by securing bolts 36.

Figure 10:
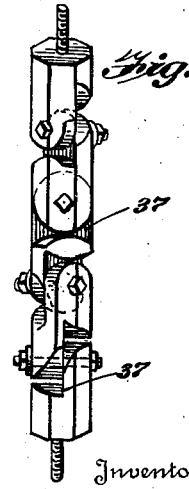
Figure 10 is a perspective view illustrating a further modified construction of flexible joint.

A further modification is illustrated in Figure 10 of the drawings, in which five links are employed, each preferably of octagonal configuration, the contacting faces 37 of adjacent links being formed at acute angles of about forty-five degrees to each other instead of ninety degrees, as in Figure 1. This construction permits bending movement in eight directions instead of four, the operation of the device being otherwise similar to the forms of the invention previously described.

Owing to the axial connection of the terminal links 10 and 11 to their respective supporting bases 9, the several sections of the joint may not only be bent at any desired angle of inclination with respect to each other, but a turning movement may be imparted to the joint as a whole about the securing bolts 12 as an axis.

It will thus be seen that there is provided a flexible joint, the construction of which is such as to allow of a wide range of movement and thus permit a mannequin to assume various postures, to effectively display dresses and other wearing apparel.

Inasmuch as the major portion of the flexible joint is constructed of wood, the cost of production is not only materially decreased, but the necessity of obtaining priorities on metal parts, incident to the manufacture thereof, is obviated. It will, of course, be understood that the flexible joints may be made in different sizes and shapes and used wherever a joint of this character is found necessary or desirable.

Having thus described the invention, what is claimed is:

1. A flexible joint of the character described comprising two terminal and a plurality of intermediate sections in axial alignment, each terminal section having at one end a longitudinally projecting ear with a rounded extremity and a rounded shoulder of similar curvature at its base, the ears and shoulders of the two terminal sections being oppositely directed and disposed at acute angles to one another respectively, the intermediate sections each having a similar longitudinally projecting ear and shoulder at both ends with the ear and shoulder at one end disposed at acute angles to those at the other end, the ears of adjacent sections being in frictional facial contact with each other to maintain said sections in adjusted angular positions, pivot pins extending transversely through the ears of the several sections, and securing bolts extending perpendicularly from the two terminal sections, said joint as a whole being rotatable about said bolts as an axis.

2. A flexible joint of the character described comprising two terminal and a plurality of intermediate sections, each of said sections being of octangular configuration with their outer faces in longitudinal alignment, each terminal section having at one end a longitudinally projecting ear with a rounded extremity and a rounded shoulder of similar curvature at its base, the ears and shoulders of the two terminal sections being oppositely directed and disposed at an angle of about forty-five degrees to each other, the intermediate sections each having a similar longitudinally projecting ear and shoulder at both ends with the ear and shoulder at one end disposed at an angle of about forty-five degrees to those at the other end, the ears of adjacent sections being in frictional facial contact to maintain said sections in adjusted angular positions, and pivot pins extending through the ears of the several sections.

LOUISE LENDINARA.